US010002414B2

(12) United States Patent
Ohno (10) Patent No.: US 10,002,414 B2
(45) Date of Patent: Jun. 19, 2018

(54) IMAGE PROCESSING APPARATUS AND AN IMAGE PROCESSING PROGRAM (71) Applicant: SHIMADZU CORPORATION, Kyoto (JP)

(72) Inventor: Yoshinori Ohno, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days. days.

(21) Appl. No.: 14/661,242

(22) Filed: Mar. 18, 2015

(65) Prior Publication Data
US 2015/0269749 A1 Sep. 24, 2015

(30) Foreign Application Priority Data

Mar. 20, 2014 (JP) ................................. 2014-058239

(51) Int. Cl.
G06K 9/00 (2006.01)
G06T 5/40 (2006.01)
(Continued)

(52) U.S. Cl.
CPC ............... G06T 5/40 (2013.01); G06T 5/008 (2013.01); H04N 1/4074 (2013.01); G06T 2207/20021 (2013.01)

(58) Field of Classification Search
CPC .......... G06T 5/008; G06T 2207/20021; H04N 1/4074
(Continued)

(56) References Cited

U.S. PATENT DOCUMENTS 6,459,819 B1* 10/2002 Nakao ................ H04N 1/00323
382/276
6,862,373 B2* 3/2005 Enomoto ................ G06T 5/006
382/260
(Continued)

FOREIGN PATENT DOCUMENTS

JP 2004-029879 A 1/2004
JP 2011-019712 A 2/2011
JP 2014-012067 A 1/2014

OTHER PUBLICATIONS

Office Action issued in corresponding Japanese Patent Application No. 2014-058239, dated May 30, 2017 with English Translation.

Primary Examiner — Mekonen Bekele
(74) Attorney, Agent, or Firm — McDermott Will & Emery LLP (57) ABSTRACT A representative value calculator calculates a representative value which is a luminance value representing a main inspection object area from an input image. On the other hand, an image divider divides an image area of the input image, and sets a plurality of divided ranges. A factor calculator calculates a tone conversion factor for enhancing or suppressing contrast adjacent the representative value calculated by the representative value calculator for each area (each divided area) divided by the image divider. A tone converter converts the tone of each pixel of the input image based on the tone conversion factor for the range divided by the image divider, which range includes a pixel for image processing, and ranges adjacent that range. As a result, the contrast of the area for which enhancement is desired can be enhanced optimally.

17 Claims, 6 Drawing Sheets (51) Int. Cl.
*G06T 5/00* (2006.01)
*H04N 1/407* (2006.01)

(58) Field of Classification Search
USPC .............. 382/173, 164, 167, 168, 112, 282
See application file for complete search history.

(56) References Cited

U.S. PATENT DOCUMENTS

| | | | | |
|---|---|---|---|---|
| 6,954,288 B2* | 10/2005 | Uekusa | ............... | H04N 1/6027 358/1.9 |
| 7,113,307 B1* | 9/2006 | Ohkubo | ............... | H04N 1/4072 358/1.9 |
| 7,844,110 B2* | 11/2010 | Hayaishi | ............... | H04N 1/62 382/162 |
| 7,916,942 B1* | 3/2011 | Ohara | ............... | H04N 1/6027 358/1.14 |
| 7,945,113 B2* | 5/2011 | Hayaishi | ............ | G06K 9/00234 382/167 |
| 8,224,048 B2* | 7/2012 | Hou | ............... | G01R 33/56563 382/128 |
| 8,228,560 B2* | 7/2012 | Hooper | ............... | G06T 5/20 348/606 |
| 8,705,811 B1* | 4/2014 | Brunner | ............... | H04N 5/20 348/169 |
| 8,818,086 B2* | 8/2014 | Roux | ............... | G06T 5/40 382/164 |
| 8,958,640 B1* | 2/2015 | McNerney | ............... | H04N 9/73 382/167 |
| 2005/0117799 A1* | 6/2005 | Fuh | ............ | G06T 5/009 382/169 |
| 2006/0098973 A1* | 5/2006 | Verdier | ............... | G03B 17/18 396/291 |
| 2007/0053587 A1* | 3/2007 | Ali | ............... | G06T 5/009 382/274 |
| 2007/0269132 A1* | 11/2007 | Duan | ............... | G06T 5/007 382/274 |
| 2008/0030814 A1* | 2/2008 | Ohara | ............... | H04N 1/4074 358/522 |
| 2009/0015683 A1* | 1/2009 | Ando | ............... | B60R 1/00 348/222.1 |
| 2009/0051794 A1* | 2/2009 | Ando | ............... | G06T 5/009 348/274 |
| 2010/0182620 A1* | 7/2010 | Moriya | ............... | G06K 9/036 358/1.9 |
| 2011/0268358 A1* | 11/2011 | Ikebe | ............... | G06T 5/008 382/172 |
| 2012/0249801 A1 | 10/2012 | Nozaki | | |
| 2013/0126733 A1 | 5/2013 | Fukuda et al. | | |
| 2014/0226903 A1* | 8/2014 | Kimura | ............... | H04N 1/6027 382/173 |

* cited by examiner

| LUMINANCE VALUE BEFORE TONE CONVERSION | LUMINANCE VALUE AFTER TONE CONVERSION |
|---|---|
| 00000000 | $lp_{00000000}$ |
| 00000001 | $lp_{00000001}$ |
| 00000010 | $lp_{00000010}$ |
| ... | ... |
| 11111101 | $lp_{11111101}$ |
| 11111110 | $lp_{11111110}$ |
| 11111111 | $lp_{11111111}$ |

IMAGE PROCESSING APPARATUS AND AN IMAGE PROCESSING PROGRAM

CROSS REFERENCE TO RELATED APPLICATIONS

This application claims priority to Japanese Patent Application No. 2014-058239 filed Mar. 20, 2014 the subject matter of which is incorporated herein by reference in entirety.

TECHNICAL FIELD

This invention relates to an image processing apparatus and an image processing program for processing input images which are inputted digital images, and more particularly to a technique of tone conversion.

BACKGROUND ART

Generally, when an image includes a bright area (area having high luminance values) and a dark area (area having low luminance values), although there is a luminance difference between the two areas, each area has no luminance difference within itself, and contrast tends to be small which renders the image unclear. As a measure for dealing with this problem, a method is known which creates an image luminance histogram having a horizontal axis representing luminance value (tone value) and a vertical axis representing frequency (number of times), and enhances contrast of tones having a large number of elements (frequency of the same luminance value) by carrying out tone conversion which uniforms luminance distributions. Contrast can be enhanced by carrying out a tone correction in this way. Various techniques for tone correction have been proposed (see Patent Documents 1 and 2, for example). Applicant herein has proposed a technique for detecting a main inspection object area (e.g. a lung field area) for which contrast enhancement is desired (see Patent Document 3, for example).

A method providing an increased effect is also known, which calculates a luminance histogram for each of a plurality of areas obtained by dividing an image, instead of one histogram for the image, and carries out tone correction for each area. Patent Document 1: Japanese Unexamined Patent Publication No. 2011-130243 discloses a method which divides an image into a plurality of block areas, carries out contrast correction for each block area, and carries out a tone conversion that does not make brightness (luminance value) discontinuous at a boundary portion between two adjoining block areas.

Patent Document 1 (Japanese Unexamined Patent Publication No. 2011-130243; Patent Document 2 (Japanese Unexamined Patent Publication No. 2011-205714; Patent Document 3 (Japanese Unexamined Patent Publication No. 2011-255033)

SUMMARY OF INVENTION

Technical Problem

However, the conventional tone conversion method based on luminance histograms has the following problems.

With the conventional tone conversion method as in Patent Document 1: Japanese Unexamined Patent Publication No. 2011-130243, contrast is adjusted in a local range within an area, but when seen as the entire image, there is a problem that a main inspection object (area of interest) to be observed is not necessarily adjusted to an optimal brightness or contrast.

For example, when an image has a large area of the same brightness such as a background present therein, there are many elements showing tones which correspond to outside of the area. Therefore, although the contrast of background part is enhanced, the contrast of the other, inspection object portions is not enhanced. Therefore, contrast is not optimized for a main inspection object (main inspection object area) to be observed, and a desirable high-quality image cannot be acquired. Although the image includes various areas about the inspection object, attention is not necessarily paid to the entire inspection object. It is desirable to have the main inspection object area to be corrected with appropriate tones. In other words, it is not desirable to have only areas other than the main inspection object area corrected with appropriate tones.

This invention has been made having regard to the state of the art noted above, and its object is to provide an image processing apparatus and an image processing program which can optimally enhance the contrast of an area for which enhancement is desired.

Solution to Problem

To fulfill the above object, this invention provides the following construction.

An image processing apparatus for processing an input image which is an inputted digital image, according to this invention, comprises a representative value calculating device for calculating a representative value which is a luminance value representing a main area from the input image; an image dividing device for dividing an image area of the input image and setting a plurality of ranges; a correspondence relation calculating device for calculating a correspondence relation regarding tone for enhancing or suppressing contrast adjacent the representative value calculated by the representative value calculating device, the correspondence relation regarding tone correlating tones of pixels of the input image and tones of pixels of an output image after image processing, for each area divided by the image dividing device; and a tone converting device for converting the tone of each pixel of the input image; wherein the tone converting device is arranged to convert the tones of pixels for the image processing based on the correspondence relation regarding tone between the range divided by the image dividing device, which range includes a pixel for image the processing, and ranges adjacent the range.

[Functions and Effects]According to the image processing apparatus of this invention, the representative value calculating device calculates a representative value which is a luminance value representing a main area from the input image. On the other hand, the image dividing device divides the image area of the input image, and sets a plurality of (divided) ranges. The correspondence relation calculating device calculates a correspondence relation regarding tone for enhancing or suppressing contrast adjacent the representative value calculated by the representative value calculating device, the correspondence relation regarding tone correlating tones of the pixels of the input image and tones of the pixels of an output image after image processing, for each area divided by the image dividing device. The tone converting device converts the tone of each pixel of the input image based on the correspondence relation regarding tone between the range divided by the image dividing device, which range includes a pixel for image processing, and ranges adjacent that range. This smoothes the luminance values of boundary portions of each area divided by the image dividing device. Even when an outside of the area for which enhancement is desired occupies a large area (e.g. background area) and a large number of elements show tones corresponding the outside of the area, the contrast of the area for which enhancement is desired can be enhanced optimally by calculating the correspondence relation regarding tone for enhancing or suppressing the contrast adjacent the representative value, and converting the tone of each pixel of the input image based on the correspondence relation relating tone.

The above main area is usually an area for which enhancement is desired. That is, the main area is a main inspection object area which is a target of contrast enhancement. In this case, the contrast of the main inspection object area for which enhancement is desired can be enhanced optimally by the correspondence relation calculating device calculating the correspondence relation regarding tone for enhancing the contrast adjacent the representative value (which represents the main inspection object area which is the target of contrast enhancement).

Of course, the above main area may be a background area which is not a target of contrast enhancement. In this case, the contrast of the background area is suppressed by the correspondence relation calculating device calculating a correspondence relation relating to tone for suppressing contrast adjacent a representative value (which represents the background area not the target of contrast enhancement). Since, as a result, the contrast of the main inspection object area for which enhancement is desired is relatively enhanced, which produces an effect equivalent to the case where the main area is the main inspection object area which is the target of contrast enhancement. This case is effective when there are two or more main inspection object areas for which enhancement is desired.

A main area determining device may be provided for determining the main area. The main area determining device comprises a computing device, and the computing device detects the main area. Consequently, the main area can be detected automatically. Of course, the main area determining device may comprise an input device, and the main area may be inputted and set by the input device. Consequently, the main area can be inputted and set manually.

The main area determining device may divide the main area into a plurality of main areas, and the representative value calculating device may calculate the representative value for each of the main areas divided by the main area determining device. Then, tone can be converted for each finer area. The main area determining device may set a plurality of main areas, and the representative value calculating device may calculate the representative value for each of the main areas set by the main area determining device. Even if the main areas are spaced from each other (i.e. the main areas are detached regions), for example, the tone conversion for each can be optimized.

The representative value may be a statistical value based on pixel data in the area, such as an average value of luminance values, a maximum value of luminance values, a minimum value of luminance values, a maximum frequency value of luminance values or a median value of luminance values, for example. When an average value of luminance values is set as the representative value, tones can be converted evenly. When a maximum value of luminance values is set as the representative value, it is possible to prevent what is called "blown out highlights" which is a state of tone portions of bright portions becoming stark white. Conversely, when a minimum value of luminance values is set as the representative value, it is possible prevent what is called "blocked up shadows" which is a state of tone portions of dark portions becoming inky black. When a maximum frequency value of luminance values is set as the representative value, and when the main area noted above is a main inspection object area which is the target of contrast enhancement, it is possible to enhance an area with many pixels (that is, having many elements) i.e. a conspicuous portion. When a median value of luminance values is set as the representative value, and when the main area noted above is a main inspection object area which is the target of contrast enhancement, it is possible to enhance values at the center.

The image dividing device may divide the image area of the input image into areas having the same shape. Calculation can be done repeatedly by dividing the image area into areas of the same shape. The image dividing device may divide the image area of the input image according to a shape of an inspection object. This can optimize the tone conversion according to the shape of the inspection object.

An image processing program for causing a computer to execute image processing for processing an input image which is an inputted digital image, according to this invention, comprises a representative value calculating step for calculating a representative value which is a luminance value representing a main area from the input image; an image dividing step for dividing the image area of the input image and setting a plurality of ranges; a correspondence relation calculating step for calculating a correspondence relation regarding tone for enhancing or suppressing contrast adjacent the representative value calculated in the representative value calculating step, the correspondence relation regarding tone correlating tones of pixels of the input image and tones of pixels of an output image after image processing, for each area divided in the image dividing step; and a tone converting step for converting the tone of each pixel of the input image; wherein the tone converting step is executed to convert the tones of pixels for the image processing based on the correspondence relation regarding tone between the range divided in the image dividing step, which range includes a pixel for image processing, and ranges adjacent the range; the computer executing processes in the above steps.

[Functions and Effects] According to the image processing program of this invention, the contrast of the area for which enhancement is desired can be enhanced optimally by causing the computer to execute the processes in the representative value calculating step, image dividing step, correspondence relation calculating step and tone converting step.

Advantageous Effects of Invention

According to the image processing apparatus according of this invention, a correspondence relation regarding tone is calculated for enhancing or suppressing contrast adjacent a representative value (representing a main area), for each area divided by the image dividing device. The tone of each pixel of the input image is converted based on the correspondence relation regarding tone between the range divided by the image dividing device, which range includes a pixel for image processing, and ranges adjacent that range. This can optimally convert the contrast of the area for which enhancement is desired.

According to the image processing program of this invention, the contrast of the area for which enhancement is desired can be enhanced optimally by causing the computer to execute the processes in the representative value calculating step, image dividing step, correspondence relation calculating step and tone converting step.

DESCRIPTION OF EMBODIMENTS

[Embodiment]

An embodiment of this invention will be described hereinafter with reference to the drawings.

Figure 1:
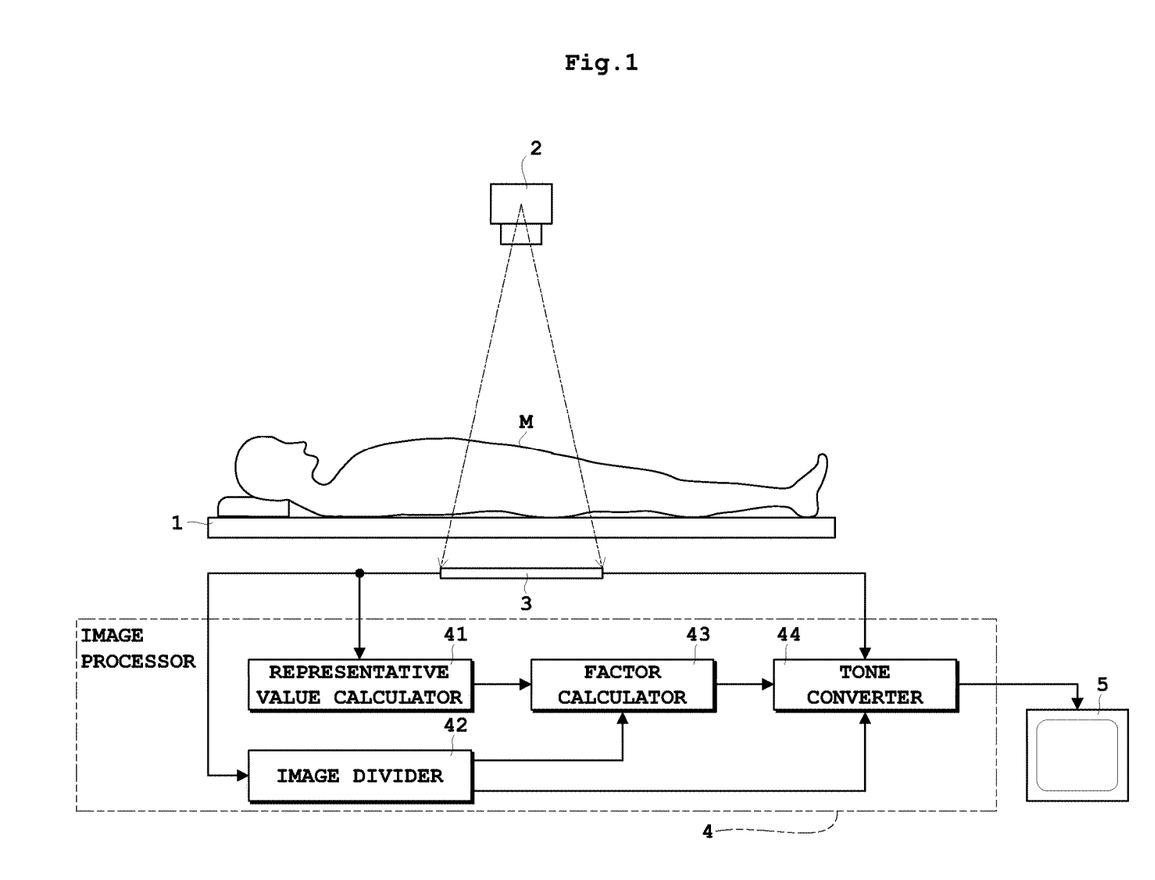
FIG. 1 is a block diagram of a radiological imaging apparatus according to an embodiment.
Figure 2:
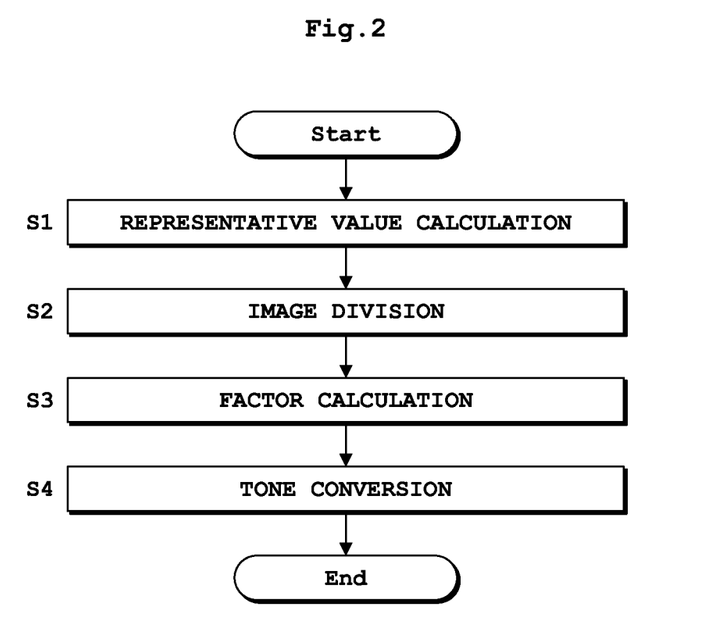
FIG. 2 is a flow chart showing a sequence of image processes according to the embodiment.
Figure 3A:
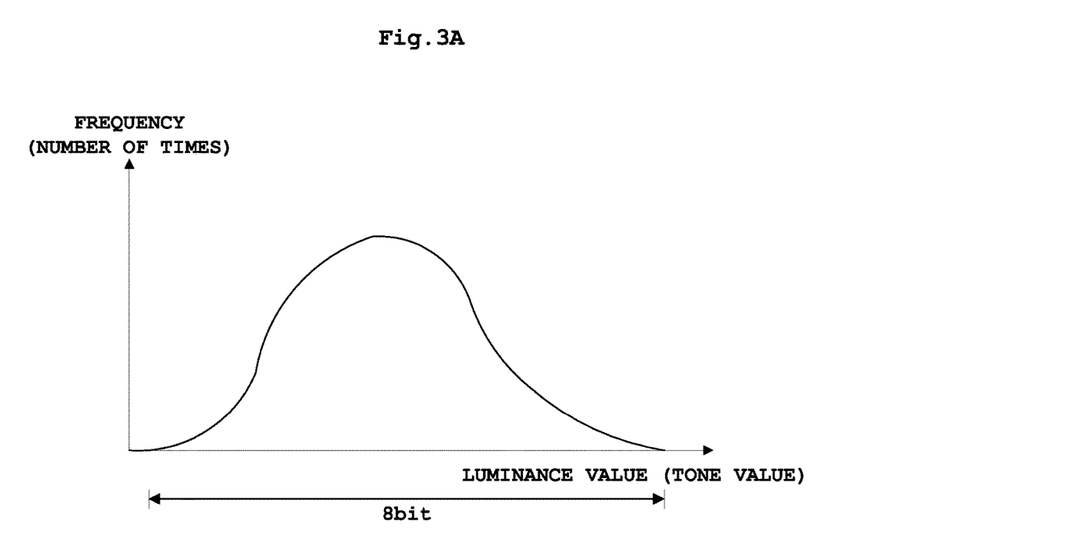
FIG. 3A is a schematic view of a luminance histogram.
Figure 3B:
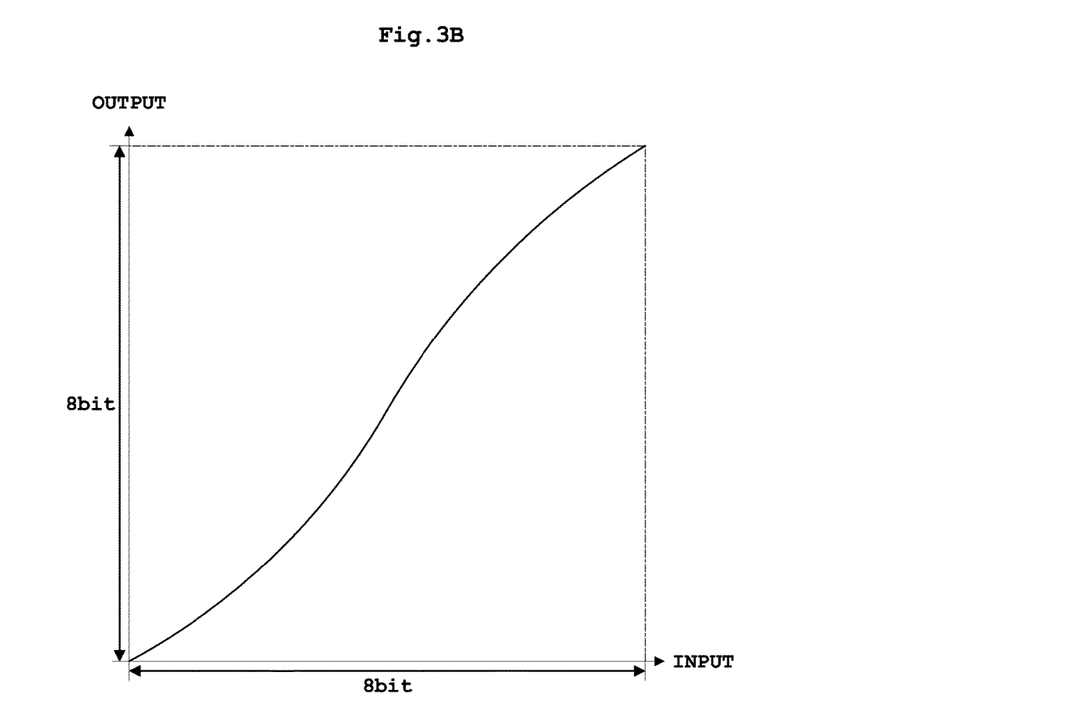
FIG. 3B is a schematic view of a tone conversion (tone curve)
Figure 4A:
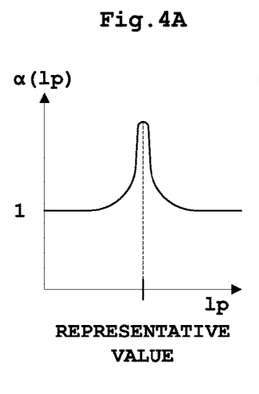
FIG. 4A shows an example of weighting factors in the case of enhancing contrast.
Figure 4B:
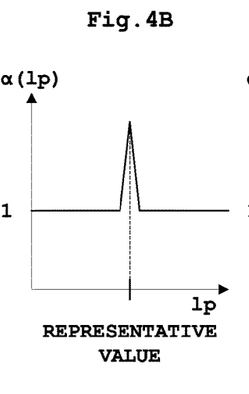
FIG. 4B is an example of weighting factors in the case of enhancing contrast.
Figure 4C:
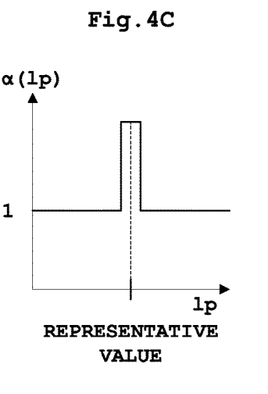
FIG. 4C is an example of weighting factors in the case of enhancing contrast.
Figure 5:
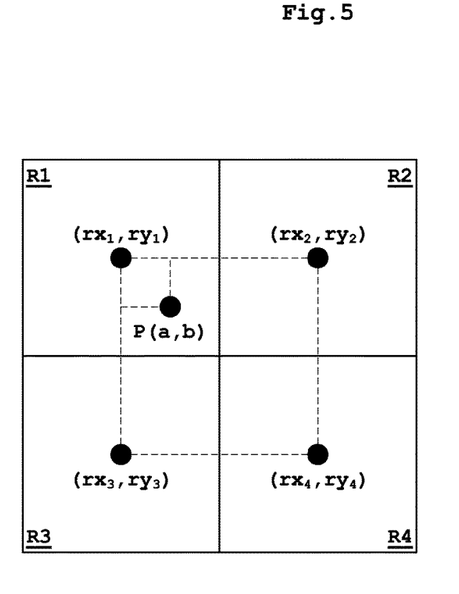
FIG. 5 is an example of addition with weighting used to calculate tone converted values.
Figure 6:
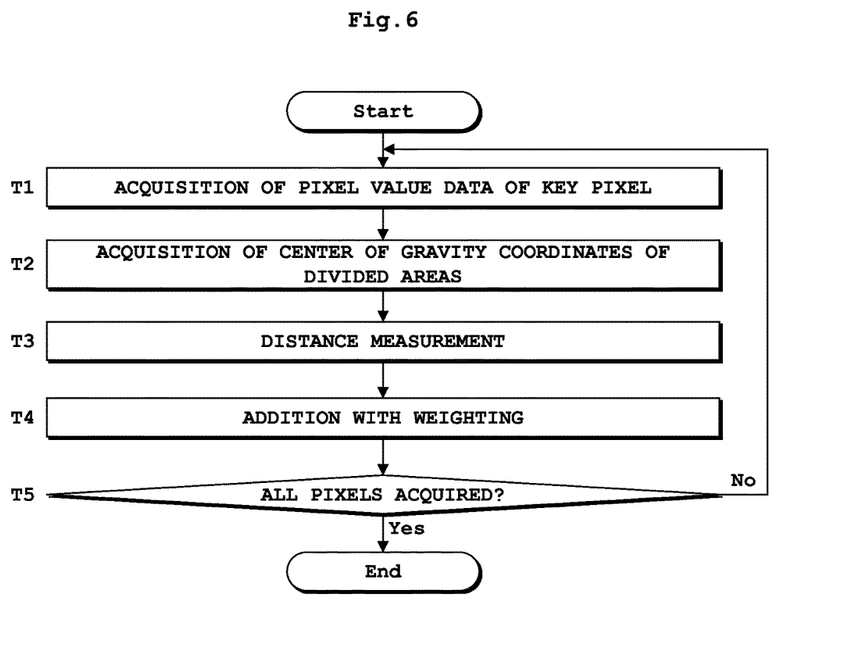
FIG. 6 is a flow chart showing a sequence of processes in a tone converter.

FIG. 1 is a block diagram of a radiological imaging apparatus according to an embodiment. FIG. 2 is a flow chart showing a sequence of image processes according to the embodiment. FIG. 3A is a schematic view of a luminance histogram. FIG. 3B is a schematic view of tone conversion (tone curve). FIGS. 4A-4C are examples of weighting factors in the case of enhancing contrast. FIG. 5 is an example of addition with weighting used to calculate tone converted values. FIG. 6 is a flow chart showing a sequence of processes in a tone converter. This embodiment will be described taking a digital image (input image) which is a radiological image obtained by the radiological imaging apparatus as an example of object for image processing, and description will be made taking tone conversion factors as an example of correspondence relation regarding tone which correlates tones of pixels in the input image and tones of pixels in an output image after image processing.

The radiological imaging apparatus according to this embodiment, as shown in FIG. 1, includes a top board 1 for supporting an inspection object M, a radiation source (e.g. an X-ray tube) 2 for emitting radiation (e.g. X-rays) toward the inspection object M, a flat panel radiation detector (hereinafter abbreviated as "FPD") 3 for detecting radiation emitted from the radiation source 2 and transmitted through the inspection object M, an image processor 4 for carrying out image processes based on the radiation detected by the FPD 3, and a display unit 5 for displaying radiological images having undergone various image processes by the image processor 4. The display unit 5 is in form of a display device such as a monitor, television screen or the like. In this embodiment, the image processor 4 is incorporated into the radiological imaging apparatus. The image processor 4 corresponds to the image processing apparatus in this invention.

The radiation detector may be a radiation detector other than the flat panel radiation detector (FPD). In the case of an X-ray detector, for example, an image intensifier (I. I) is used. Since a radiological image obtained by being detected by the radiation detector of the analog type in this way is an analog image, this analog image may be sent to the image processor 4 for digital conversion into a digital image.

The image processor 4 is formed of a central processing unit (CPU) and the like. A program and the like for carrying out the various image processes are written to and stored in a storage medium represented by a ROM (Read-only Memory), and the image processes according to the program are carried out by the CPU of the image processor 4 executing the program after reading the program and the like from the storage medium. In particular, a representative value calculator 41, an image divider 42, a factor calculator 43 and a tone converter 44, described hereinafter, of the image processor 4 execute the program relating to calculation of representative values, division of an image area, calculation of correspondence relations regarding tone (tone conversion factors in this embodiment) and conversion of the tone of each pixel in the input image, thereby to carry out calculation of representative values, division of the image area, calculation of correspondence relations regarding tone (tone conversion factors) and conversion of the tone of each pixel in the input image according to the program, respectively (see the flow chart of FIG. 2). The program relating to calculation of representative values, division of the image area, calculation of correspondence relations regarding tone (tone conversion factors) and conversion of the tone of each pixel of the input image corresponds to the image processing program in this invention.

A radiological image detected and obtained by the FPD 3 is sent as a digital image to the image processor 4. The image processor 4 includes the representative value calculator 41 for calculating a representative value which is a luminance value representing a main inspection object area from the input image which is the inputted digital image, the image divider 42 for dividing the image area of the input image to set a plurality of ranges, the factor calculator 43 for calculating a tone conversion factor which enhances or suppresses contrast adjacent the representative value calculated by the representative value calculator 41 for each divided area provided by the image divider 42, and the tone converter 44 for converting the tone of each pixel in the input image. The tone converter 44 converts the tones of the pixels which are targets of image processing, based on the tone conversion factors for a divided range provided by the image divider 42 and including the pixels which are the targets of image processing and for ranges adjacent the above divided range. The representative value calculator 41 corresponds to the representative value calculating device in this invention. The image divider 42 corresponds to the image dividing device in this invention. The factor calculator 43 corresponds to the correspondence relation calculating device in this invention. The tone converter 44 corresponds to the tone converting device in this invention.

The FPD 3 is connected to the representative value calculator 41, image divider 42 and tone converter 44, and sends a radiological image (digital image) to each. The representative value calculator 41 is connected to the factor calculator 43, and sends the representative value to the factor calculator 43. The image divider 42 is connected to the factor calculator 43 and tone converter 44, and sends the divided ranges to each. The factor calculator 43 is connected to the tone converter 44, and sends the tone conversion factor to the tone converter 44. An image (image after tone conversion) having the tone of each pixel in the input image converted by the tone converter 44 is sent to the display unit 5 to be displayed thereon.

(Step S1) Representative Value Calculation

The representative value calculator 41 calculates a representative value which is a luminance value representing a main inspection object area from the input image. This embodiment will be described taking a chest front image in a radiological image as an example of input image. In the case of a chest front image, a portion of the lung field (lung field area) is an important portion to be observed at the time of diagnosis, and serves as a main inspection object area for observation. The representative value calculator 41 detects the lung field area, and sets an average luminance value of the detected area as a luminance value (representative value) representing the main inspection object. Apart from the average luminance value, a statistical value based on pixel data within the area, such as a maximum value, a minimum value, a maximum frequency value or a median value within the area, may be set as the representative value.

The method in Patent Document 3: Japanese Unexamined Patent Publication No. 2011-255033 described hereinbefore is used as the method of detecting the lung field area. Of course, the area may be detected using another known method which detects an area using luminance variations or the like (primary differential or secondary differential), and an average luminance value of the area may be set as the representative value. In addition, with the input image displayed on the display unit 5, the operator (user) may manually input and set the area based on display results on the display unit. In that case, the operator (user) may manually input and set a plurality of main inspection object areas.

Instead of specifying a plurality of main inspection object areas, the main inspection object area may be divided into a plurality of areas, and the representative value calculator 41 may calculate a representative value for each of the divided main inspection object areas. In the case of specifying a plurality of main inspection object areas, and also in the case of dividing the main inspection object area into a plurality of areas, the areas may be set automatically using the above method of computation, or may be inputted and set manually.

The method of calculating a representative value is not limited to these techniques noted above. Pixels having large luminance variations may be extracted from the input image, and an average luminance value within a predetermined range (within a predetermined range of the lung field area here) centering on a centroid computation of the extracted pixels may be set as the representative value. In this embodiment, since the main area is an area for which enhancement is desired (main inspection object area which is a target of contrast enhancement), an average luminance value in that area is set as the representative value. However, when the main area is a background area, an average luminance value outside the predetermined range, conversely, may be set as the representative value. The case of the main area being a background area will be described in detail hereinafter as a modification. Further, an average luminance value of pixels included in the main inspection object area and the predetermined range from the central position of the image area may be set as the representative value. This step S1 corresponds to the representative value calculating step in this invention.

(Step S2) Image Division

The image divider 42 divides the image area of the input image to set a plurality of ranges. In this embodiment, the ranges are set each to have 1/n in size of the height and width of the input image, and the image area is divided into $n^2$ areas. Note that n preferably has a value 4 to 64. Of course, the number of divisions in the directions of height and width need not be the same (n here), and the lengths in height and width need not be the same, either.

By creating image data consisting only of pixel data within the divided ranges, image areas having the individually divided ranges (hereinafter abbreviated to "divided areas"). Each divided area holds a unique area identification number. Here, the area identification numbers are given sign p (p being natural numbers; p=1, 2, 3, and so on).

The method of dividing the image area is not limited to those techniques described above. The shape of the divided ranges may be different in aspect ratio from the input image, which may, for example, be square, rectangular, or oblong such as rhombic or trapezoidal, circular, or polygonal represented by hexagon. That is, there is no limitation as to the shape of the divided ranges as long as it is a closed figure. Although circular is mentioned above, it will be appreciated that the pixels are square dots, which are in a practical sense polygons infinitely close to circles. The shape and size of the divided ranges are not limited to the same shape or size, but may have different shapes and sizes among themselves. Further, the divided ranges may include mutually overlapping portions.

The image area of the input image is divided into areas having the same shape, by setting ranges each being 1/n in size of the height and width of the input image, and dividing the image area into $n^2$ areas, as described hereinbefore. Of course, instead of dividing the image area of the input image into areas having the same shape, the image area of the input image may be divided according to the shape (lung field area here) of the inspection object M (see FIG. 1). This step S2 corresponds to the image dividing step in this invention.

(Step S3) Factor Calculation

Based on tone distributions of the ranges divided by the image divider 42, the factor calculator 43 calculates tone conversion factors for enhancing or suppressing contrast adjacent the representative value calculated by the representative value calculator 41. For this purpose, the factor calculator 43 receives the representative value from the representative value calculator 41, and receives divided area image data correlated with each area identification number p from the image divider 42. The factor calculator 43 creates a tone conversion formula by calculating a luminance histogram which is a tone distribution concerning each divided area, and normalizing an accumulated number of elements with a bit width of the image. When, example, an input before tone conversion is 8-bit image data (image data with 8-bit tone values (tone values of $2^8$: 0 to 255)), the accumulated number of elements are normalized with a bit width of the image by adjusting also an output after tone conversion to the 8-bit image data. FIG. 3A is a schematic view of a luminance histogram of the 8-bit tone value. FIG. 3B is a schematic view of tone conversion (tone curve) with the input and output both adjusted to the 8-bit image data (indicated "8 bit" in FIG. 3A and FIG. 3B). The output may be normalized with a bit width different from the input, instead of being limited to 8 bits.

At this time, the number of elements adjacent the representative value are weighted. In the case of 8-bit image data, about 10 percent of 8 bits (25-26) are adjacent the representative value. In the case of 8-bit image data, tone conversion formula Tp(I) for a p-th area identification number is calculated from the computational expression in the following equation (1), where I is tone, h(I) is the number of elements of tone I, and α(I) is a weighting factor. Tone conversion formula Tp(I) corresponds to the tone conversion factor in this invention.

[Math 1]

$$Tp(I) = \frac{\sum_{I=0}^{I} h(I)\alpha(I)}{\sum_{I=0}^{255} h(I)\alpha(I)} \times 255 \qquad (1)$$

For enhancing the contrast adjacent the representative value, weighting factor α(I), as shown in FIGS. 4A-4C, is a function showing a value larger than "1" when the value of tone I is adjacent the representative value, and showing "1" when the value of tone I is not adjacent the representative value (in FIGS. 4A-4C, the tone value is indicated lp and the weighting factor α(lp)). As shown in FIG. 4A, weighting factor α(I) may change smoothly. As shown in FIG. 4B, weighting factor α(I) may decrease and increase monotonically across the representative value. As shown in FIG. 4C, weighting factor α(I) may have a constant value in the vicinity and inclusive of the representative value. The function of weighting factor α(I) is not limited to the above forms, but may be any other function as long as its value adjacent the representative value is one or more.

Although suitable values are set beforehand to the width (width of the vicinity) for enhancing the value and the strength of enhancement, these values can be changed as appropriate by the operator (user). Further, the factor calculator 43 calculates center of gravity coordinates of a pixel forming the divided area of each area identification number p, and holds the center of gravity coordinates along with the tone conversion formula Tp(I) derived from the above equation (1) as correlated with the area identification number p. The vicinity is not limited to ten percent of the bit width, but the width of the vicinity may be changed as appropriate by the operator (user) as noted above. Further, two or more representative values may be set to the same main inspection object area.

Thus, when the main area is an area for which enhancement is desired (main inspection object area which is a target of contrast enhancement), tone conversion formula Tp(I) (tone conversion factor) consisting of weighting factor α(I) (see FIGS. 4A-4C) for enhancing the contrast adjacent the representative value is calculated in order to enhance the contrast adjacent the representative value representing the main inspection object area which is the target of contrast enhancement. This step S3 corresponds to the correspondence relation calculating step in this invention.

(Step S4) Tone Conversion

The tone converter 44 converts the tone of each pixel of the input image based on the tone conversion factor (tone conversion formula Tp(I)) for the range divided by the image divider 42, which is the range having pixels for image processing, and for the ranges adjacent that range. For this purpose, the tone converter 44 receives the data of tone conversion formula Tp(I) corresponding to each divided area along with the center of gravity coordinates, and receives the input image which is a radiological image (digital image) from the FPD 3. Then, the tone converter 44 carries out tone conversion on the pixel values (luminance values) of the input image.

Assuming that the coordinate position of a pixel for image processing (key pixel) is P (a, b), a tone converted value of P (a, b) is calculated by addition with weighting of tone conversion formula Tp(I) corresponding to the divided area including P (a, b) and tone conversion formula Tp(I) of the divided areas adjacent the divided area including P (a, b). In this embodiment, the weighting is determined from a distance between a center of gravity position of each divided area and the position of the pixel. An example is shown in FIG. 5.

Assume that the pixel (key pixel) P (a, b) for image processing belongs a divided area R1, and that divided areas adjoining the divided area R1 vertically and horizontally are R2, R3 and R4, respectively. Assume that the tone conversion formulas for the respective divided areas R1, R2, R3 and R4 are $Tr_1$, $Tr_2$, $Tr_3$ and $Tr_4$ in the order of divided areas R1, R2, R3 and R4. Assume further that the center of gravity coordinates of the respective divided areas R1, R2, R3 and R4 are $(rx_1, ry_1)$, $(rx_2, ry_2)$, $(rx_3, ry_3)$ and $(rx_4, ry_4)$ in the order of divided areas R1, R2, R3 and R4.

For expediency of illustration, FIG. 5 shows the respective center of gravity coordinates x, y in corresponding positions (that is, the figure bounded by the center of gravity coordinates $(rx_1, ry_1)$, $(rx_2, ry_2)$, $(rx_3, ry_3)$ and $(rx_4, ry_4)$ is shown as a square). Note, however, that this arrangement in practice includes a situation where these coordinates are not in corresponding positions.

At this time, tone converted value lp' is calculated from the following equation (2), where lp is a luminance value (before tone conversion) of pixel (key pixel) P (a, b) for image processing, and lp' is a luminance value after tone conversion (tone converted value):

[Math 2]

$$lp' = \frac{ry_3 - b}{ry_3 - ry_1}\left[\frac{rx_2 - a}{rx_2 - rx_1}Tr_1(lp) + \frac{a - rx}{rx_2 - rx_1}Tr_2(lp)\right] + \frac{b - ry_1}{ry_3 - ry_1}\left[\frac{rx_4 - a}{rx_4 - rx_3}Tr_3(lp) + \frac{a - rx_3}{rx_4 - rx_3}Tr_4(lp)\right] \qquad (2)$$

The case where the figure bounded by the center of gravity coordinates of the divided areas is not a square is not limited to the above equation (2). In this case, a tone converted value is calculated by addition with weighting corresponding to the distances between the key pixel and the center of gravity coordinates of the divided areas. The adjoining ranges may be changed according to the shapes of the divided areas, instead of being limited to the case shown in FIG. 5. The case of contacting at a vertex like the area (divided area R4) at the lower right of FIG. 5 is also included in the adjoining ranges.

The above equation (2) can eliminate differences in level of luminance occurring at boundary portions of each divided area. Therefore, luminance values of the boundary portions of each divided area are smoothed by addition with weighting in the above equation (2).

The flow chart of FIG. 6 shows a sequence of processes in the tone converter 44.

(Step T1) Acquisition of Pixel Value Data of Key Pixel

Pixel value data (luminance value data) of the key pixel is acquired.

(Step T2) Acquisition of Center of Gravity Coordinates of Divided Areas

The divided areas adjoining the coordinates of the key pixel vertically and horizontally are detected, and center of gravity coordinates of each divided area are acquired.

(Step T3) Distance Measurement

A distance between the coordinates of the key pixel and the center of gravity coordinates of each adjoining divided area acquired in step T2 is measured.

(Step T4) Addition with Weighting

Addition with weighting of the tone conversion formula (tone conversion factor) is carried out for each divided area. By carrying out the addition with weighting corresponding to the distances measured in step T3, luminance values after tone conversion (tone converted values) are calculated from the above equation (2).

(Step T5) all Pixels Acquired?

Whether all the pixels in the input image have been acquired or not is determined. When not acquired, the operation returns to step T1 to repeat the same process.

When all the pixels in the input image have been acquired, the luminance values after tone conversion (tone converted values) are arranged according to the corresponding pixels. Based on this, tone conversions are carried out of the pixel values (luminance values) of the input image. Step S4 (see FIG. 2) including steps T1-T5 (see FIG. 6) corresponds to the tone converting step in this invention.

The display unit 5 receives the image after tone conversion, and outputs and displays it on a display device such as a monitor. Output results are written to and stored in a storage medium (not shown) such as a hard disk or memory represented by a RAM (Random Access Memory).

In this embodiment, the luminance values (tone converted values) after tone conversion are calculated by addition with weighting corresponding to the distances of the center of gravity positions of the divided areas and the position of the key pixel, but this is not limitative. Other known methods may be used, which smooth the boundary portions of the divided areas without differences in level of luminance occurring there.

According to the image processor 4 (image processing apparatus) in this embodiment, the representative value calculator 41 calculates a representative value which is a luminance value representing a main area (main inspection object area in this embodiment) from the input image. On the other hand, the image divider 42 divides the image area of the input image, and sets a plurality of (divided) ranges. The factor calculator 43 calculates a correspondence relation (tone conversion factor (tone conversion formula Tp(I))) regarding tone for enhancing or suppressing (enhancing in this embodiment) contrast adjacent the representative value calculated by the representative value calculator 41, the correspondence relation (tone conversion factor (tone conversion formula Tp(I))) regarding tone correlating tones of the pixels of the input image and tones of the pixels of an output image after image processing, for each area (each divided area) divided by the image divider 42. The tone converter 44 converts the tone of each pixel of the input image based on the correspondence relation (tone conversion factor (tone conversion formula Tp(I))) regarding tone between the range divided by the image divider 42, which range includes a pixel for image processing, and ranges adjacent that range. This smoothes the luminance values of boundary portions of each area (each divided area) divided by the image divider 42. Even when an outside of the area for which enhancement is desired occupies a large area (e.g. background area) and a large number of elements show tones corresponding the outside of the area, the contrast of the area for which enhancement is desired can be enhanced optimally by calculating the correspondence relation (tone conversion factor (tone conversion formula Tp(I))) regarding tone for enhancing or suppressing the contrast adjacent the representative value, and converting the tone of each pixel of the input image based on the correspondence relation (tone conversion factor (tone conversion formula Tp(I))) relating tone.

The main area is usually an area for which enhancement is desired. That is, in this embodiment, the main area is a main inspection object area which is a target of contrast enhancement. In this case, the contrast of the main inspection object area for which enhancement is desired can be enhanced optimally by the factor calculator 43 calculating the correspondence relation (tone conversion factor (tone conversion formula Tp(I)) in the embodiment) regarding tone for enhancing the contrast adjacent the representative value (which represents the main inspection object area which is the target of contrast enhancement).

As described hereinbefore, the main area determining device for determining the main area is in form of a computing device (e.g. CPU or FPGA (Field-Programmable Gate Array)), and the computing device detects the main area (main inspection object area in the embodiment). Consequently, the main area (main inspection object area) can be detected automatically. Of course, the main area determining device may be the input device, and the main area (main inspection object area) may be inputted and set by the input device. Consequently, the main area (main inspection object area) can be inputted and set manually.

As described hereinbefore, the main area determining device may divide the main area (main inspection object area in the embodiment) into a plurality of areas, and the representative value calculator 41 may calculate the representative value for each of the main areas (each main inspection object area) divided by the main area determining device. Then, tone can be converted for each finer area. The main area determining device may set a plurality of main areas (main inspection object areas), and the representative value calculator 41 may calculate the representative value for each of the main areas (each main inspection object area) set by the main area determining device. Even if the main areas are spaced from each other (i.e. the main areas are detached regions) like the right and left lung field areas, for example, the tone conversion for each can be optimized.

As described hereinbefore, the representative value may be a statistical value based on pixel data in the area, such as an average value of luminance values, a maximum value of luminance values, a minimum value of luminance values, a maximum frequency value of luminance values or a median value of luminance values, for example. When an average value of luminance values is set as the representative value, tones can be converted evenly. When a maximum value of luminance values is set as the representative value, it is possible to prevent what is called "blown out highlights" which is a state of tone portions of bright portions becoming stark white. Conversely, when a minimum value of luminance values is set as the representative value, it is possible prevent what is called "blocked up shadows" which is a state of tone portions of dark portions becoming inky black. When a maximum frequency value of luminance values is set as the representative value, and when the main area is a main inspection object area which is the target of contrast enhancement as in this embodiment, it is possible to enhance an area with many pixels (that is, having many elements) i.e. a conspicuous portion. When a median value of luminance values is set as the representative value, and when the main area is a main inspection object area which is the target of contrast enhancement as in this embodiment, it is possible to enhance values at the center.

As described hereinbefore, the image divider 42 may divide the image area of the input image into areas having the same shape. Calculation can be done repeatedly by dividing the image area into areas of the same shape. The image divider 42 may divide the image area of the input image according to the shape of inspection object M (e.g. lung field area). This can optimize the tone conversion according to the shape of the inspection object M.

According to the image processing program in this embodiment, the contrast of the area for which enhancement is desired can be enhanced optimally by causing a computer to execute the processes in steps S1-S4 of FIG. 2 which correspond to the representative value calculating step, image dividing step, correspondence relation calculating step and tone converting step.

This invention is not limited to the foregoing embodiment, but may be modified as follows:

(1) The foregoing embodiment has been described taking a digital image (input image) which is a radiological image obtained by a radiological imaging apparatus as an example of the target of image processing. However, the invention is not limited to such digital image. The target of image processing may be a digital image obtained by a digital imaging device exemplified by a digital camera, digital video recorder or the like, or a digital image obtained by digital conversion of an analog image. Further, the target of image processing may be a digital image resulting from digital conversion of nuclear medicine data, obtained by a nuclear medicine diagnostic apparatus, of an inspection object medicated with a radioactive drug.

(2) In the foregoing embodiment, the invention is applied to the radiological imaging apparatus for medical use in which the inspection object is a human body. The invention is applicable also to a nondestructive testing apparatus in which the inspection object is not a human body, but which is for radiographing the internal structure of substrates.

(3) In the foregoing embodiment, the image processor (image processing apparatus) is included in the radiological imaging apparatus. Instead, the image processor (image processing apparatus) may be a separate entity, with the radiological imaging apparatus acting as an external device.

Figure 7A:
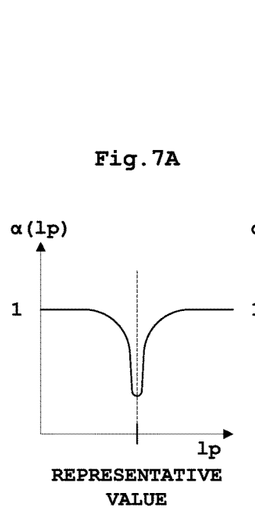
FIG. 7A is an example of weighting factors in the case of suppressing contrast.
Figure 7B:
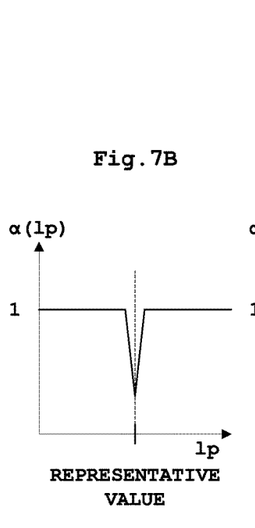
FIG. 7B is an example of weighting factors in the case of suppressing contrast.
Figure 7C:
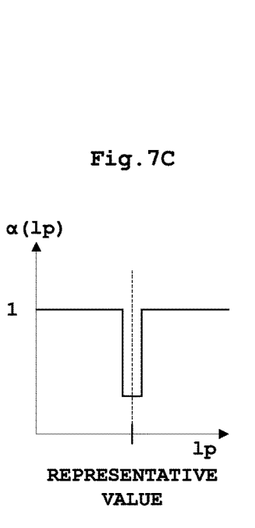
FIG. 7C is an example of weighting factors in the case of suppressing contrast.

(4) In the foregoing embodiment, the main area is a main inspection object area which is a target of contrast enhancement. Conversely, it may be a background area which is not a target of contrast enhancement. In this case, the contrast of the background area is suppressed by calculating a correspondence relation (tone conversion factor (tone conversion formula Tp(I)) in the embodiment) relating to tone for suppressing contrast adjacent a representative value (which represents the background area not the target of contrast enhancement). Specifically, for suppressing the contrast adjacent the representative value, weighting factor α(I) forming the tone conversion formula Tp(I), as shown in FIGS. 7A-7C, is a function showing a value smaller than "1" when the value of tone I is adjacent the representative value, and showing "1" when the value of tone I is not adjacent the representative value (in FIGS. 7A-7C, the tone value is indicated lp and the weighting factor α(lp)). Since, as a result, the contrast of the main inspection object area for which enhancement is desired is relatively enhanced, which produces an effect equivalent to the case where the main area is the main inspection object area which is the target of contrast enhancement. This case is effective when there are two or more main inspection object areas for which enhancement is desired.

(5) In the foregoing embodiment, a correspondence relation (tone conversion factor in the embodiment) regarding tone for enhancing or suppressing contrast adjacent the representative value is calculated based on a tone distribution (luminance histogram), as shown in FIG. 3A, of ranges divided by the image divider 42 (see FIG. 1), but this is not limitative. Without going through the luminance histogram of FIG. 3A, contrast adjacent the representative value may be enhanced or suppressed by directly controlling the tone conversion (tone curve) of FIG. 3B for each area (each divided area) divided by the image divider 42.

Figure 8:
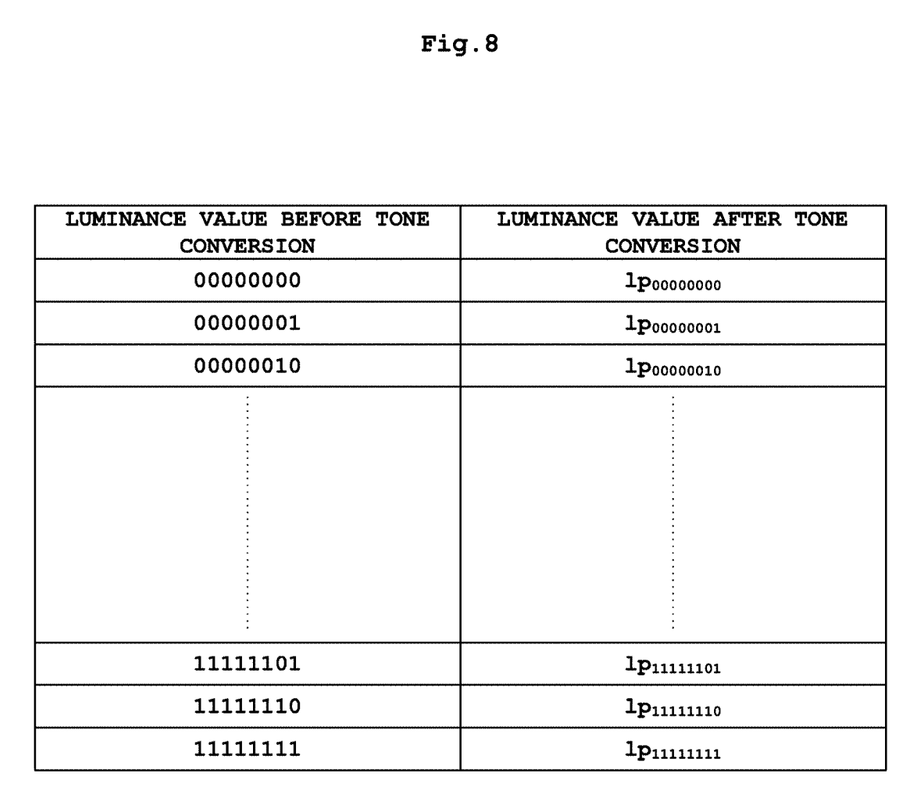
FIG. 8 is a schematic view of correspondence relations regarding tone arranged in a table form.

(6) The foregoing embodiment has been described taking the tone conversion factor (tone conversion formula Tp(I)) as an example of correspondence relation regarding tone which correlates the tones of pixels of an input image and the tones of pixels of an output image after image processing. The invention is limited to the above formula or tone conversion factor. As shown in FIG. 8, the correspondence relation regarding tone may be put in a table form. In FIG. 8, with luminance values before tone conversion (here, 8-bit image data: "00000000", "00000001", "00000010", . . . , "11111101", "11111110" and "11111111") serving as indexes, luminance values after tone conversion (here, $lp_{00000000}$, $lp_{00000001}$, $lp_{00000010}$, . . . , $lp_{11111101}$, $lp_{11111110}$ and $lp_{11111111}$) are arranged in a table form. Based on this, calculation may be carried out for the correspondence relation regarding tone which correlates the tones of pixels of an input image and the tones of pixels of an output image after image processing.

INDUSTRIAL UTILITY

As described above, this invention is suitable for digital imaging devices such as radiological imaging apparatus, digital cameras and digital video recorders.

REFERENCE SIGNS LIST

4 . . . image processor
41 . . . representative value calculator
42 . . . image divider
43 . . . factor calculator
44 . . . tone converter
α(I) . . . weighting factor
Tp(I) . . . tone conversion formula
P (a, b) . . . pixel for image processing (key pixel)
lp' . . . luminance value after tone conversion (tone converted value)

The invention claimed is:

1. An image processing apparatus for processing an input image which is an inputted digital image, comprising:
a representative value calculating device for calculating a representative value which is a luminance value representing a main area from the input image;
an image dividing device for dividing an image area of the input image and setting a plurality of ranges;
a pixel values range setting device for setting a range of predetermined pixel values including the representative value based on the representative value calculated by the representative value calculating device;
a correspondence relation calculating device for calculating a correspondence relation regarding tone for enhancing or suppressing contrast of the range of predetermined pixel values including the representative value set by the pixel values range setting device, the correspondence relation regarding tone correlating tones of pixels of the input image and tones of pixels of an output image after image processing, for each area divided by the image dividing device, in which the correspondence relation regarding tone for range divided by the image dividing device, which the tone range includes a pixel for the image processing, is based on the correspondence relation regarding tone for ranges adjacent the range; and a tone converting device for converting the tone of each pixel of the input image, for each area divided by the image dividing device, based on the correspondence relation regarding tone calculated by the correspondence relation calculating device a number of pixels having the tone, and a weighting factor of the number of pixels adjacent the representative value.

2. The image processing apparatus according to claim 1, wherein:

the main area is a main inspection object area which is a target of contrast enhancement; and the correspondence relation calculating device is arranged to calculate the correspondence relation regarding tone for enhancing contrast of the range of predetermined pixel values including the representative value.

3. The image processing apparatus according to claim 1, wherein:

the main area is a background area which is outside a target of contrast enhancement; and the correspondence relation calculating device is arranged to calculate the correspondence relation regarding tone for suppressing contrast of the range of predetermined pixel values including the representative value.

4. The image processing apparatus according to claim 1, comprising a main area determining device for determining the main area.

5. The image processing apparatus according to claim 4, wherein:

the main area determining device comprises a computing device; and the computing device is arranged to detect the main area.

6. The image processing apparatus according to claim 4, wherein:

the main area determining device comprises an input device; and the input device is arranged to input and set the main area.

7. The image processing apparatus according to claim 4, wherein:

the main area determining device is arranged to divide the main area into a plurality of main areas; and the representative value calculating device is arranged to calculate the representative value for each of the main areas divided by the main area determining device.

8. The image processing apparatus according to claim 4, wherein:

the main area determining device is arranged to set a plurality of main areas; and the representative value calculating device is arranged to calculate the representative value for each of the main areas set by the main area determining device.

9. The image processing apparatus according to claim 1, wherein the representative value is a statistical value based on pixel data in the area.

10. The image processing apparatus according to claim 9, wherein the representative value is an average value of luminance values.

11. The image processing apparatus according to claim 9, wherein the representative value is a maximum value of luminance values.

12. The image processing apparatus according to claim 9, wherein the representative value is a minimum value of luminance values.

13. The image processing apparatus according to claim 9, wherein the representative value is a maximum frequency value of luminance values.

14. The image processing apparatus according to claim 9, wherein the representative value is a median value of luminance values.

15. The image processing apparatus according to claim 1, wherein the image dividing device is arranged to divide the image area of the input image into areas having the same shape.

16. The image processing apparatus according to claim 1, wherein the image dividing device is arranged to divide the image area of the input image according to a shape of an inspection object.

17. A non-transitory computer readable medium storing an image processing program, when executed, causing a computer to carry out image processing steps comprising:

a representative value calculating step for calculating a representative value which is a luminance value representing a main area from an input image;

an image dividing step for dividing the image area of the input image and setting a plurality of ranges;

a pixel values range setting step for setting a range of predetermined pixel values including the representative value based on the calculated representative value;

a correspondence relation calculating step for calculating a correspondence relation regarding tone for enhancing or suppressing contrast of the range of predetermined pixel values including the representative value set by the pixel values range setting step, the correspondence relation regarding tone correlating tones of pixels of the input image and tones of pixels of an output image after image processing, for each area divided in the image dividing step, in which the correspondence relation regarding tone for range divided in the image dividing step, which the tone range includes a pixel for the image processing, is based on the correspondence relation regarding tone for ranges adjacent the range; and a tone converting step for converting the tone of each pixel of the input image, for each area divided in the image dividing step, based on the correspondence relation regarding tone calculated in the correspondence relation calculating step, a number of pixels having the tone, and a weighting factor of the number of pixels adjacent the representative value.

* * * * *